US010496920B2

(12) United States Patent
Deselaers et al.

(10) Patent No.: US 10,496,920 B2
(45) Date of Patent: Dec. 3, 2019

(54) ENHANCED COMMUNICATION ASSISTANCE WITH DEEP LEARNING

(71) Applicant: Google Inc., Mountain View, CA (US)

(72) Inventors: Thomas Deselaers, Zurich (CH); Victor Carbune, Basel (CH); Pedro Gonnet Anders, Zurich (CH); Daniel Martin Keysers, Stallikon (CH)

(73) Assignee: Google LLC, Mountain View, CA (US)

( * ) Notice: Subject to any disclaimer, the term of this patent is extended or adjusted under 35 U.S.C. 154(b) by 460 days.

(21) Appl. No.: 15/349,037

(22) Filed: Nov. 11, 2016

(65) Prior Publication Data

US 2018/0137400 A1    May 17, 2018

(51) Int. Cl.
*G06N 3/04*    (2006.01)

(52) U.S. Cl.
CPC .................... *G06N 3/0445* (2013.01)

(58) Field of Classification Search
CPC .................................... G06N 3/0445
See application file for complete search history.

(56) References Cited

U.S. PATENT DOCUMENTS

| | | | | |
|---|---|---|---|---|
| 2007/0208567 A1* | 9/2007 | Amento | ................... | G10L 15/22 704/270 |
| 2010/0268682 A1* | 10/2010 | Lewis | .................. | G06Q 10/107 706/54 |
| 2011/0004946 A1* | 1/2011 | Lee | ...................... | G06Q 10/107 726/30 |
| 2016/0294755 A1* | 10/2016 | Prabhu | .................... | H04L 51/12 |
| 2016/0350290 A1* | 12/2016 | Fujiwara | ............. | G06F 17/2854 |
| 2017/0270919 A1* | 9/2017 | Parthasarathi | .......... | G10L 15/20 |

OTHER PUBLICATIONS

Riezler et al., "Query Rewriting using Monolingual Statistical Machine Translation", Computational Linguistics, vol. 36, Issue 3, Sep. 2010, pp. 569-582.
Sutskever et al., "Sequence to Sequence Learning with Neural Networks", Advances in Neural Information Processing Systems 27, Montreal, Canada, Dec. 8-13, 2014, 9 pages.

* cited by examiner

*Primary Examiner* — Kamran Afshar
*Assistant Examiner* — Bahram Yousefi
(74) *Attorney, Agent, or Firm* — Dority & Manning, P.A.

(57) ABSTRACT

The present disclosure provides systems and methods that leverage machine-learned models (e.g., neural networks) to provide enhanced communication assistance. In particular, the systems and methods of the present disclosure can include or otherwise leverage a machine-learned communication assistance model to detect problematic statements included in a communication and/or provide suggested replacement statements to respectively replace the problematic statements. In one particular example, the communication assistance model can include a long short-term memory recurrent neural network that detects an inappropriate tone or unintended meaning within a user-composed communication and provides one or more suggested replacement statements to replace the problematic statements.

16 Claims, 6 Drawing Sheets

ENHANCED COMMUNICATION ASSISTANCE WITH DEEP LEARNING

FIELD

The present disclosure relates generally to communication processing. More particularly, the present disclosure relates to enhanced communication assistance featuring machine-learned models.

BACKGROUND

Misunderstandings occasionally happen in written communication because additional communication channels such as body language are unavailable. For example, a written statement may be interpreted as having a certain undesirable tone, while the same statement delivered orally would not be so interpreted.

As another example, an individual composing a written communication may be more prone to making statements that the individual later regrets. Carelessness in written communications is also problematic. For example, an individual may inadvertently make a legally problematic statement.

To add to these problems, the threshold for what is considered problematic human communication is highly context-dependent. For example, a message from a writer to a first recipient may not be problematic in the context of an existing relationship between the writer and the first recipient, but may be problematic if delivered to a second recipient that has a different relationship with the writer.

Certain existing technologies have attempted to solve small, discrete problems of this type. For example, an existing email assistant can automatically detect when the text of an email mentions an attachment but the email does not contain an attachment.

However, limited solutions of this type do not provide a comprehensive solution to different types of communication problems, including inappropriate/offensive language, ambiguous wording, legally problematic wording, or undesirable tone (e.g., overly aggressive or passive aggressive tone).

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for communication assistance. The method includes receiving, by one or more computing devices, a first communication provided by a user. The method includes providing, by the one or more computing devices, a first set of sequential communication data descriptive of the first communication provided by the user for input into a machine-learned communication assistance model. The machine-learned communication assistance model includes at least one long short-term memory recurrent neural network. The method includes receiving, by the one or more computing devices, one or more indications that respectively identify one or more problematic statements included in the first communication. The one or more indications were output by the machine-learned communication assistance model. The method includes providing, by the one or more computing devices, information regarding the one or more problematic statements for display to the user.

Another example aspect of the present disclosure is directed to a computing system to provide communication assistance. The computing system includes at least one processor. The computing system includes a machine-learned communication assistance model that includes at least one recurrent neural network. The communication assistance model is trained to receive a first set of sequential communication data descriptive of a first communication provided by a user and, in response to receipt of the first set of sequential communication data, detect one or more problematic statements included in the first communication. The computing system includes at least one tangible, non-transitory computer-readable medium that stores instructions that, when executed by the at least one processor, cause the at least one processor to: obtain the first set of sequential communication data descriptive of the first communication provided by the user; input the first set of sequential communication data into the communication assistance model; and receive, as an output of the communication assistance model, one or more indications that respectively identify the one or more problematic statements included in the first communication.

Another example aspect of the present disclosure is directed to a user computing device that includes at least one processor and at least one non-transitory computer-readable medium that stores instructions that, when executed by the at least one processor, cause the user computing device to receive a first communication provided by a user. Execution of the instructions further causes the user computing device to provide a first set of communication data descriptive of the first communication provided by the user for input into a machine-learned communication assistance model. The machine-learned communication assistance model includes at least one long short-term memory recurrent neural network. Execution of the instructions further causes the user computing device to receive one or more indications that respectively identify one or more problematic statements included in the first communication. The one or more indications were output by the machine-learned communication assistance model. Execution of the instructions further causes the user computing device to display a notification that indicates the existence of the one or more problematic statements.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Reference numerals that are repeated across plural figures are intended to identify the same features in various implementations.

DETAILED DESCRIPTION

Overview

Generally, the present disclosure is directed to systems and methods that leverage machine-learned models (e.g., neural networks) to provide enhanced communication assistance. In particular, the systems and methods of the present disclosure can include or otherwise leverage a machine-learned communication assistance model to detect problematic statements included in a communication and/or provide suggested replacement statements to respectively replace the problematic statements. In one particular example, the communication assistance model can include a long short-term memory recurrent neural network that detects an inappropriate tone or unintended meaning within a user-composed communication and provides one or more suggested replacement statements to replace the problematic statements. Thus, the present disclosure provides enhanced communication assistance through the use of machine-learned models and, therefore, includes computing components that can in some instances be referred to as a "smart communication assistant."

More particularly, the systems and methods of the present disclosure can provide communication assistance to a user in any situation in which a user is composing a communication. As one example, the systems and methods of the present disclosure can be employed within the context of a text message (e.g., SMS message) composition interface, an email composition interface (e.g., as a portion of an email client application), or any other text composition interface of an application (e.g., a word processing application). Thus, the systems and methods can receive and analyze a textual communication as the user types it into the composition interface.

As other examples, the systems and methods of the present disclosure can be included as a browser plug-in that works as a user types into an interface of a browser window, as an overlay or feature of a keyboard (e.g., a virtual keyboard on a mobile device), as a feature within a dictation application, or in other contexts. Thus, in some implementations, the communication assistance models of the present disclosure can be included in or otherwise stored and implemented by a user computing device such as a laptop, tablet, or smartphone.

As yet another example, the communication assistance models can be included in or otherwise stored and implemented by a server computing device that communicates with the user computing device according to a client-server relationship. For example, the communication assistance models can be implemented by the server computing device as a portion of a web service (e.g., a web email service).

The communication data descriptive of the communication can be analyzed a single time (e.g., just prior to transmission of the communication from the author to the recipient) or multiple times (e.g., as the communication is entered by the user or periodically according to a schedule, such as, for example, every 5 seconds). For communication assistance models implemented by a server computing device, the communication data can make multiple round-trips to perform multiple detection/replacement cycles.

Regardless, the systems and methods described herein can receive a set of communication data descriptive of a communication provided by a user and can analyze such communication data to provide communication assistance. In some implementations, the set of communication data can be a set of sequential communication data. For example, the sequential communication data can describe text in an order in which it was entered by the user. In some implementations, the set of communication data includes an entire message thread that led to the new communication provided by the user.

Thus, in some implementations, in order to obtain the benefits of the techniques described herein, the user may be required to allow the collection and analysis of communication data and/or other data associated with the user. Therefore, in some implementations, users may be provided with an opportunity to adjust settings to control whether and how much (if any) the systems of the present disclosure collect and/or analyze such information. However, if the user does not allow collection and use of such information, then the user may not receive the benefits of the techniques described herein. In addition, in some implementations, certain information or data can be treated in one or more ways before or after it is used, so that personally identifiable information is removed or not stored permanently.

According to an aspect of the present disclosure, the systems and methods described herein can include or otherwise leverage a machine-learned communication assistance model. In particular, in one example, the communication assistance model is trained to receive the set of communication data descriptive of a communication and, as a result of receipt of the communication data, output one or more indications that respectively identify one or more problematic statements included in the communication. Thus, in some implementations, the communication assistance model can include a detection portion that is operable to detect problematic statements included in a user-composed communication.

As an example, the detection portion of the communication assistance model can include one or more neural networks (e.g., deep neural networks). For example, the detection portion of the communication assistance model can include one or more recurrent neural networks such as, for example, long short-term memory (LSTM) recurrent neural networks, gated recurrent unit networks, or other recurrent neural networks. In other implementations, in addition or alternatively to one or more neural networks, the detection portion of the communication assistance model can include other forms of machine-learned models such as, for example, support vector machines, hidden Markov models, and other machine-learned classifiers. In addition, in some implementations, the detection portion of the communication assistance model can include or implement additional alternative approaches such as rule-based systems (e.g., as machine-learned from data or manually created).

In yet further implementations, the detection portion of the communication assistance model can include a feature extraction component that extracts one or more features of the communication to be analyzed. The extracted features can then be provided to the remainder of the detection portion (e.g., a neural network or other machine-learned model) for use in detecting any problematic statement(s) included in the communication based at least in part on such features. Thus, the detection portion of the communication assistance model can leverage a number of different machine-learning approaches to detect problematic statements.

The one or more neural networks or other machine-learned models can be trained on a training dataset that includes, for example, training example communications that include one or more portions that are labeled as problematic and/or one or more portions that are labeled as non-problematic. In particular, in some implementations, the problematic portions of the training examples can be labeled as corresponding to a particular category of problematic statements and/or can be labeled with a score indicative of the degree to which such portion is problematic. In addition, in some implementations, each training example can further include an example replacement statement for each portion labeled as problematic.

As examples, categories of problematic statements can include inappropriate language (e.g., offensive or derogatory terms or euphemisms); inappropriate tone (e.g., passive-aggressive tone or overly aggressive tone); statements that reveal confidential information; legally problematic statements; and/or an unintended meaning. Thus, training the detection portion of the communication assistance model (e.g., a deep LSTM recurrent neural network) on an appropriate training dataset can further enable the communication assistance model to not only recognize explicitly offensive words but also perform the more complex task of detecting more subtle problematic statements such as, for example, inappropriate tone, derogatory euphemisms, or biased language. In additional implementations, the communication assistance model can detect when an individual composing a communication is intoxicated or otherwise incapacitated.

According to another aspect of the present disclosure, in some implementations, the detection portion of the communication assistance model can output one or more confidence scores respectively for the one or more problematic statements identified within the communication. The confidence score for each problematic statement can indicate a confidence that the identified statement is indeed problematic or can otherwise indicate a degree to which the identified statement is problematic. For example, a larger score can indicate a greater confidence that the statement is problematic or that the statement is relatively more problematic while a lower score can indicate a lesser confidence that the statement is problematic or that the statement is relatively less problematic. In some implementations, the detection portion of the communication assistance model can output, for each identified problematic statement, a confidence score for each potential category of problematic statements. In other implementations, only the score for the most confident category is output.

The systems and methods of the present disclosure can use the confidence score(s) in various ways. As one example, in some implementations, the confidence score for each identified problematic statement can be compared to a particular threshold value to determine whether to notify the user of the problematic statement or otherwise intervene. Thus, for example, the systems of the present disclosure can ignore a first problematic statement that has a confidence score below the threshold value, but notify the user regarding a second problematic statement that has a confidence score greater than the particular threshold value. Additionally or alternatively, user controlled settings can be used to control notification frequency, style, thresholds, etc.

As another example, the mechanism by which the systems of the present disclosure notify the user of the problematic statement or otherwise intervene can be a function of or otherwise dependent upon the confidence score(s). Thus, for example, the systems of the present disclosure can provide a non-intrusive notification for a first problematic statement that has a confidence score that is less than a particular threshold value (but greater than a base threshold value), but can automatically replace a second problematic statement (e.g., with a suggested replacement statement) that has a confidence score greater than the particular threshold value.

As yet another example, the threshold values for notification/intervention can be a function of a context associated with the communication. In particular, as one example, the threshold values for notification/intervention in a professional communication context may be relatively less than the threshold values for notification/intervention in a casual, light-hearted context. Thus, the systems and methods of the present disclosure can adjust various thresholds based on a determined context.

As another example, the threshold values can be learned or otherwise adjusted based on user-specific feedback. For example, if a user repeatedly ignores or dismisses suggested replacements, the threshold for intervention can be increased, so that a user who does not value the communication assistance is not continuously pestered. On the other hand, if a user repeatedly accepts suggested replacement statements, the threshold for intervention can be decreased, so that a user who appreciates and uses the communication assistance is provided with additional assistance.

In addition, the larger/smaller and greater-than/less-than conventions used in the above discussion for confidence scores and threshold values are provided as examples only; in alternative implementations, such conventions can be inverted.

According to yet another aspect of the present disclosure, in some implementations, in addition to the detection portion described above, the communication assistance models can include a replacement portion that provides one or more suggested replacement statements to respectively replace the one or more problematic statements. As examples, the replacement portion of the communication assistance model can include one or more neural networks (e.g., recurrent neural networks such as LSTM recurrent neural networks), phrase-based translators, sequence-to-sequence models, or other machine translators. As another example, the replacement portion of the communication assistance model can include a set of phrases component that substitutes a given problematic phrase with a respective non-problematic phrase associated therewith. The set of corresponding problematic/non-problematic phrases can be learned from data and/or manually created.

In addition, as described above, the threshold for what is considered problematic human communication can be strongly context-dependent. For example, it is common that an individual may use different wording or tones depending upon the recipient of the communication (e.g., compare the appropriate tone of an email containing a PhD application to a professor versus the appropriate tone of an email to a friend of twenty years).

As such, according to another aspect of the present disclosure, in some implementations, the communication assistance models of the present disclosure can include a context component that assists in performing context-specific detection and/or replacement of problematic statements based on the identity of the author, the identity of the recipient, and/or other contextual information.

As an example, in some implementations, the context component can receive the identity of the author, the identity of the recipient, and/or other contextual information as inputs and, in response, output a context score. For example, the other contextual information can include a message thread that led to the current communication.

In some implementations, the context score can describe an expected tone for the communication (e.g., whether the communication is expected to or should be polite, professional, casual, direct, etc.). In other implementations, the context score can include one or more numerical scores that indicate expected values for certain communication characteristics (e.g., tone, language, grammatical precision, etc.).

In some implementations, the context score can be input into the remainder of the detection portion of the communication assistance model (e.g., an LSTM recurrent neural network) along with the communication itself. The context score can assist the detection portion of the communication assistance model in determining which, if any, portions of the communication should be identified as problematic.

In addition to or alternatively to use of the context score by the detection portion, the replacement portion of the communication assistance model can use the context score to assist in producing suitable suggested replacement statements. In particular, an appropriate replacement statement can differ if the communication is directed to a close friend rather than a professional colleague. Therefore, in some implementations, the context score can be input into the replacement portion of the communication assistance model along with the identification of the one or more problematic statements included in the communication. The replacement portion can output the suggested replacement statements respectively for the problematic statements based at least in part on the context score.

In some implementations, the context component can include one or more machine-learned models such as, for example, one or more neural networks. As one example, in some implementations, given appropriate user consent, a neural network or other machine-learned model can be trained for each pair of author and recipient. For example, the context component can be trained on one or more previous communications from the author (e.g., to the particular intended recipient), so as to recognize or otherwise learn an expected tone for the author (e.g., as relative to the particular intended recipient). In some implementations, to enhance user privacy, the communications themselves are not stored, but scores descriptive of certain communication characteristics (e.g., tone, language, grammatical precision, etc.) can be determined and stored instead, for use in training a user-specific context component. In addition, as described above, in some implementations, users may be provided with an opportunity to adjust settings to control whether and how much (if any) the systems of the present disclosure collect and/or analyze communication data.

In some implementations, rather than a discrete context component, the various models of the detection portion and/or replacement portion of the communication assistance model can be trained to have the identity of the sender, the identity of the recipient, and/or other contextual information as explicit input features. For example, one or more models of the replacement portion can be trained from the beginning incorporating sender and recipient as input features, allowing the model to capture particularities during the regular training process.

According to another aspect of the present disclosure, the systems and methods of the present disclosure can notify the user to the existence of the problematic statement in a number of ways. As one example, a non-intrusive notification (e.g., a pop-up window or icon in a lower screen area) can be provided that simply notifies the user of the existence of the one or more problematic statements. If the user selects or otherwise engages with the notification, additional information (e.g., explicit identification of the problematic statements and/or the suggested replacement statements) can be displayed or otherwise provided. The user can be provided with the opportunity to accept the replacement statements.

As another example, portions of a communication designated as problematic can be displayed differently from non-problematic portions within the communication composition interface. For example, problematic statements can be highlighted, underlined, or otherwise visually set apart from the non-problematic portions. If a user selects the problematic statement (e.g., right clicks on the statement) the user can be presented with the suggested replacement statement and the opportunity to accept or reject such replacement statement.

As yet another example, the systems and methods of the present disclosure can automatically replace the one or more problematic statements with the one or more suggested replacement statements. After automatic replacement, the inserted replacement statements can be highlighted or otherwise visually set apart and the user can be provided with the option of undoing or otherwise rejecting the automatic replacements (e.g., by right clicking and rejecting the replacement). As another example, in the mobile context or other touch-input context, tapping on the phrase could trigger a replacement menu or other actions.

Thus, the user can be provided with controls that enable the user to always maintain full control of the ultimate content of the communication. For example, automatic replacement can be explicitly controlled (e.g., turned on/off) using a user-adjustable setting.

Furthermore, as described above, in some implementations, the mechanism by which the systems and methods of the present disclosure notify the user of the problematic statement or otherwise intervene can be a function of or otherwise dependent upon confidence score(s) provided by the communication assistance model for the problematic statement(s). Thus, for example, a non-intrusive notification can be provided for a first problematic statement that has a confidence score that is less than a particular threshold value (but greater than a base threshold value), while a second problematic statement that has a confidence score greater than the particular threshold value can be automatically replaced (e.g., with a suggested replacement statement).

As another example, the notification mechanisms can be adjusted based on user-specific feedback. For example, if a user repeatedly ignores or dismisses suggested replacements, the notifications can be reduced or made less intrusive, so that a user who does not value the communication assistance is not continuously pestered. On the other hand, if a user repeatedly accepts suggested replacement statements, the notifications can be increased or made more automatic, so that a user who appreciates and uses the communication assistance is provided with additional assistance.

The systems and methods of the present disclosure provide a number of technical benefits. As one example, previous approaches assist in communication composition by using simple rules distilled into hand-crafted processing algorithms (e.g., if an email contains the word "attached" but there is no attachment, then warn the user that there is no attachment). However, the approach provided herein enables the construction of a machine-learned communication assistance model based on real user data. The communication assistance model automatically learns desired transformations from problematic to non-problematic statements. Such structure facilitates the scaling or transformation of the systems and methods described herein to multiple languages and/or different contexts. In addition, the systems and methods of the present disclosure can be adapted to the particular communication context of the specific conversation in which the user is engaging. These benefits can be provided by the use of an end-to-end machine-learned system. Additional technical benefits of the present disclosure include improved, comprehensive communication assistance that resolves many different categories of communication issues with a single processing system. The use of neural networks or other machine-learned models also enables reduced processing times, as such models very fast and require only minimal storage space.

With reference now to the Figures, example embodiments of the present disclosure will be discussed in further detail.

Example Devices and Systems

Figure 1A:
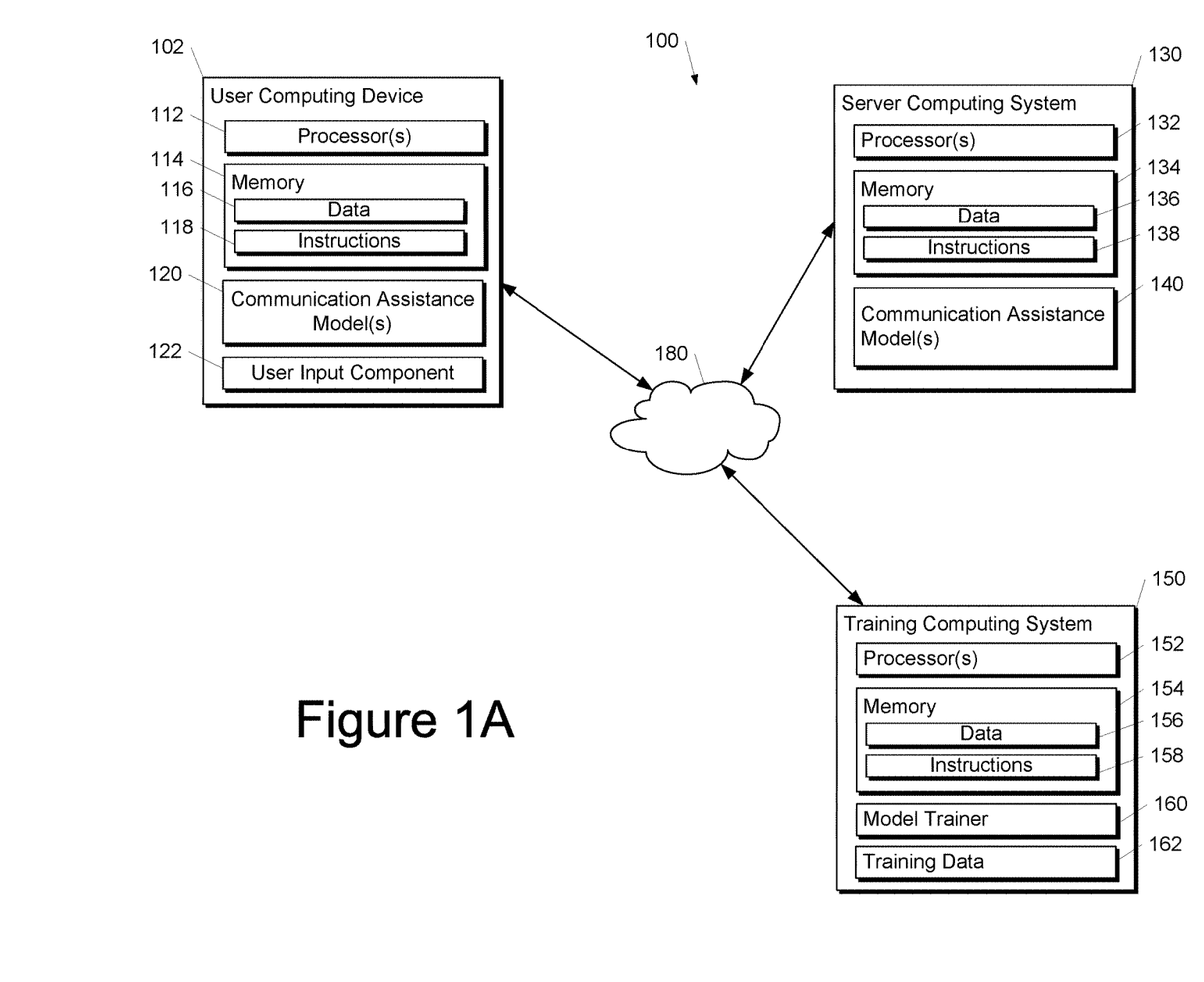
FIG. 1A depicts a block diagram of an example computing system that performs communication assistance according to example embodiments of the present disclosure.

FIG. 1A depicts a block diagram of an example computing system 100 that performs communication assistance according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can store or include one or more communication assistance models 120. For example, the communication assistance models 120 can be or can otherwise include various machine-learned models such as neural networks (e.g., deep recurrent neural networks) or other multi-layer non-linear models. Example communication assistance models 120 are discussed with reference to FIGS. 2-5.

In some implementations, the one or more communication assistance models 120 can be received from the server computing system 130 over network 180, stored in the user computing device memory 114, and the used or otherwise implemented by the one or more processors 112. In some implementations, the user computing device 102 can implement multiple parallel instances of a single communication assistance model 120 (e.g., to perform parallel communication assistance across multiple instances of user communication).

More particularly, communication assistance model(s) 120 can provide communication assistance to a user in any situation in which a user is composing a communication with the user computing device 102. As one example, the communication assistance model(s) 120 can be employed within the context of a text messaging application of the user computing device 102, an email application of the user computing device 102, or any other text composition interface of an application (e.g., a word processing application). As other examples, the communication assistance model(s) 120 can be included as a browser plug-in that works as a user types into an interface of a browser application of the user computing device 102, as an overlay or feature of a keyboard (e.g., a virtual keyboard on the user computing device 102), as a feature within a dictation application of the user computing device 102, or in other contexts. Thus, the communication assistance model(s) 120 can receive and analyze a textual communication as the user types it into the composition interface (e.g., via a keyboard, virtual keyboard, microphone, or other user input component 122).

Additionally or alternatively, one or more communication assistance models 140 can be included in or otherwise stored and implemented by the server computing system 130 that communicates with the user computing device 102 according to a client-server relationship. For example, the communication assistance models 140 can be implemented by the server computing system 140 as a portion of a web service (e.g., a web email service). Thus, one or more models 120 can be stored and implemented at the user computing device 102 and/or one or more models 140 can be stored and implemented at the server computing system 130.

Communication data descriptive of a user communication can be analyzed a single time (e.g., just prior to transmission of the communication from the author to the recipient) or multiple times (e.g., as the communication is entered by the user or periodically according to a schedule, such as, for example, every 5 seconds). For communication assistance models 140 implemented by the server computing system 130, the communication data can make multiple round-trips to perform multiple detection/replacement cycles.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise includes one or more machine-learned communication assistance models 140. For example, the communication assistance models 140 can be or can otherwise include various machine-learned models such as neural networks (e.g., deep recurrent neural networks) or other multi-layer non-linear models. Example communication assistance models 140 are discussed with reference to FIGS. 2-6.

The server computing system 130 can train the communication assistance models 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 140 stored at the server computing system 130 using various training or learning techniques, such as, for example, backwards propagation of errors (e.g., truncated backpropagation through time). The model trainer 160 can perform a number of generalization techniques (e.g., weight decays, dropouts, etc.) to improve the generalization capability of the models being trained.

In particular, the model trainer 160 can train a communication assistance model 140 based on a set of training data 142. The training data 142 can includes, for example, training example communications that include one or more portions that are labeled as problematic and/or one or more portions that are labeled as non-problematic. In particular, in some implementations, the problematic portions of the training examples can be labeled as corresponding to a particular category of problematic statements and/or can be labeled with a score indicative of the degree to which such portion is problematic. In addition, in some implementations, each training example can further include an example replacement statement for each portion labeled as problematic.

As examples, categories of problematic statements can include inappropriate language (e.g., offensive or derogatory terms or euphemisms); inappropriate tone (e.g., passive-aggressive tone, unprofessional tone, or overly aggressive tone); statements that reveal confidential information; legally problematic statements; and/or an unintended meaning.

In some implementations, if the user has provided consent, the training examples can be provided by the user computing device 102 (e.g., based on communications previously provided by the user of the user computing device 102). Thus, in such implementations, the model 120 provided to the user computing device 102 can be trained by the training computing system 150 on user-specific communication data received from the user computing device 102.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the communication assistance models 120 can be both trained and used locally at the user computing device 102. In some of such implementations, the user computing device 102 can implement the model trainer 160 to personalize the communication assistance models 120 based on user-specific data.

Figure 1B:
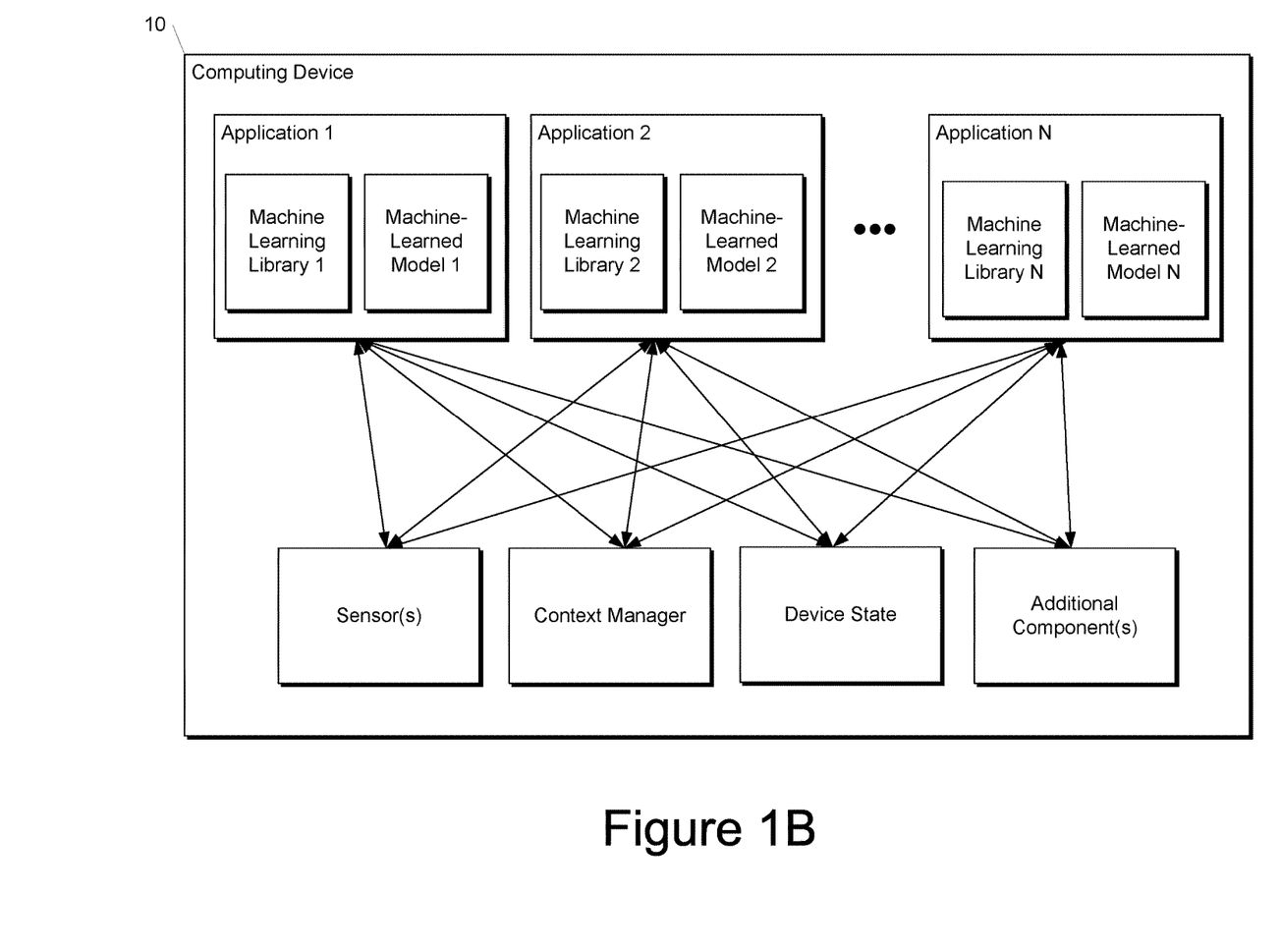
FIG. 1B depicts a block diagram of an example computing device that performs communication assistance according to example embodiments of the present disclosure.

FIG. 1B depicts a block diagram of an example computing device 10 that performs communication assistance according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned communication assistance model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
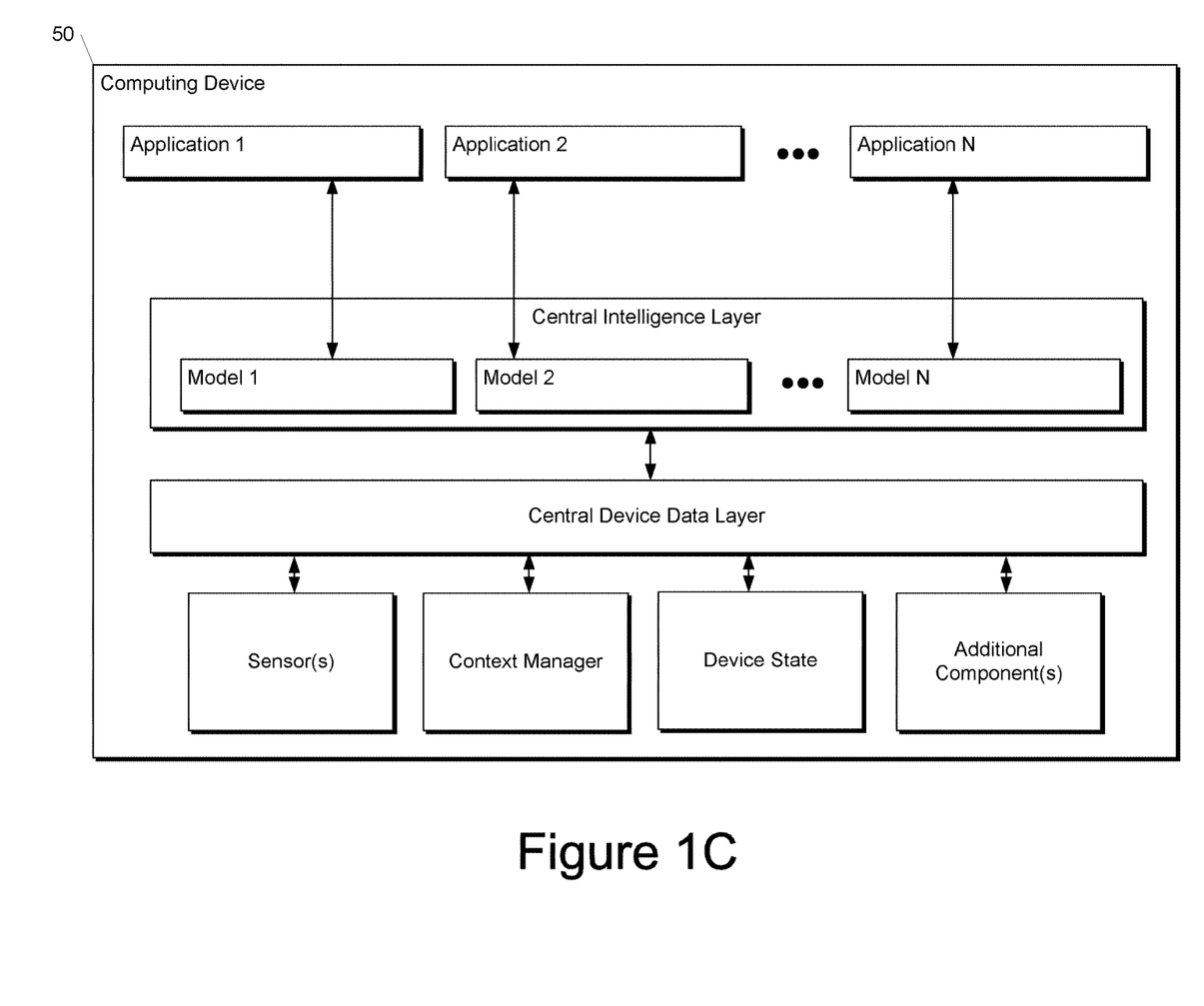
FIG. 1C depicts a block diagram of an example computing device that performs communication assistance according to example embodiments of the present disclosure.

FIG. 1C depicts a block diagram of an example computing device 50 that performs communication assistance according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a communication assistance model) can be provided for each application and managed by the central intelligence layer. In other implementations, two or more applications can share a single machine-learned model. For example, in some implementations, the central intelligence layer can provide a single model (e.g., a single communication assistance model) for all of the applications.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
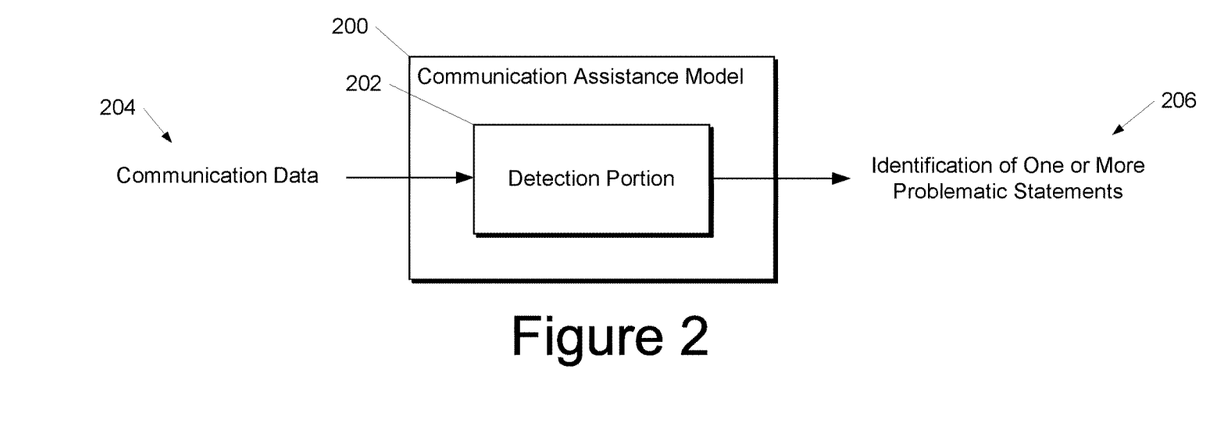
FIG. 2 depicts a block diagram of an example communication assistance model according to example embodiments of the present disclosure.

FIG. 2 depicts a block diagram of an example communication assistance model 200 according to example embodiments of the present disclosure. In some implementations, the communication assistance model 200 is trained to receive a set of communication data 204 descriptive of a communication and, as a result of receipt of the communication data 204, output one or more indications 206 that respectively identify one or more problematic statements included in the communication. Thus, in some implementations, the communication assistance model 200 can include a detection portion 202 that is operable to detect problematic statements included in a user-composed communication.

In some implementations, the set of communication data 204 can be a set of sequential communication data. For example, the sequential communication data can describe text in an order in which it was entered by the user. In some implementations, the set of communication data includes an entire message thread that led to the new communication provided by the user. In other implementations, the set of communication data includes only a new communication provided by the user.

As examples, the detection portion 202 of the communication assistance model 200 can include one or more neural networks (e.g., deep neural networks). For example, the detection portion 202 of the communication assistance model 200 can include one or more recurrent neural networks such as, for example, long short-term memory (LSTM) recurrent neural networks, gated recurrent unit networks, or other recurrent neural networks. In other implementations, in addition or alternatively to one or more neural networks, the detection portion 202 of the communication assistance model 200 can include other forms of machine-learned models such as, for example, support vector machines, hidden Markov models, and other machine-learned classifiers. In addition, in some implementations, the detection portion 202 of the communication assistance model 200 can include or implement additional alternative approaches such as rule-based systems (e.g., as machine-learned from data or manually created).

The one or more neural networks or other machine-learned models can be trained on a training dataset that includes, for example, training example communications that include one or more portions that are labeled as problematic and/or one or more portions that are labeled as non-problematic. In particular, in some implementations, the problematic portions of the training examples can be labeled as corresponding to a particular category of problematic statements and/or can be labeled with a score indicative of the degree to which such portion is problematic. In addition, in some implementations, each training example can further include an example replacement statement for each portion labeled as problematic.

As examples, categories of problematic statements can include inappropriate language (e.g., offensive or derogatory terms or euphemisms); inappropriate tone (e.g., passive-aggressive tone or overly aggressive tone); statements that reveal confidential information; legally problematic statements; and/or an unintended meaning. Thus, training the detection portion of the communication assistance model (e.g., a deep LSTM recurrent neural network) on an appropriate training dataset can further enable the communication assistance model to not only recognize explicitly offensive words but also perform the more complex task of detecting more subtle problematic statements such as, for example, inappropriate tone, derogatory euphemisms, or biased language. In additional implementations, the communication assistance model can detect when an individual composing a communication is intoxicated or otherwise incapacitated.

According to another aspect of the present disclosure, in some implementations, the detection portion 202 of the communication assistance model 200 can output one or more confidence scores respectively for the one or more problematic statements 206 identified within the communication. The confidence score for each problematic statement can indicate a confidence that the identified statement is indeed problematic or can otherwise indicate a degree to which the identified statement is problematic. For example, a larger score can indicate a greater confidence that the statement is problematic or that the statement is relatively more problematic while a lower score can indicate a lesser confidence that the statement is problematic or that the statement is relatively less problematic. In some implementations, the detection portion 202 of the communication assistance model 200 can output, for each identified problematic statement, a confidence score for each potential category of problematic statements. In other implementations, only the score for the most confident category is output.

The systems and methods of the present disclosure can use the confidence score(s) in various ways. As one example, in some implementations, the confidence score for each identified problematic statement can be compared to a particular threshold value to determine whether to notify the user of the problematic statement or otherwise intervene. Thus, for example, the systems of the present disclosure can ignore a first problematic statement that has a confidence score below the threshold value, but notify the user regarding a second problematic statement that has a confidence score greater than the particular threshold value.

As another example, the mechanism by which the systems of the present disclosure notify the user of the problematic statement or otherwise intervene can be a function of or otherwise dependent upon the confidence score(s). Thus, for example, the systems of the present disclosure can provide a non-intrusive notification for a first problematic statement that has a confidence score that is less than a particular threshold value (but greater than a base threshold value), but can automatically replace a second problematic statement (e.g., with a suggested replacement statement) that has a confidence score greater than the particular threshold value.

As yet another example, the threshold values for notification/intervention can be a function of a context associated with the communication. In particular, for example, the threshold values for notification/intervention in a professional communication context may be relatively less than the threshold values for notification/intervention in a casual, light-hearted context. Thus, the systems and methods of the present disclosure can adjust various thresholds based on a determined context. Other example content-dependent aspects will be discussed further below.

As another example, the threshold values can be adjusted based on user-specific feedback. For example, if a user repeatedly ignores or dismisses suggested replacements, the threshold for intervention can be increased, so that a user who does not value the communication assistance is not continuously pestered. On the other hand, if a user repeatedly accepts suggested replacement statements, the threshold for intervention can be decreased, so that a user who appreciates and uses the communication assistance is provided with additional assistance.

In addition, the larger/smaller and greater-than/less-than conventions used in the above discussion for confidence scores and threshold values are provided as examples only; in alternative implementations, such conventions can be inverted.

Figure 3:
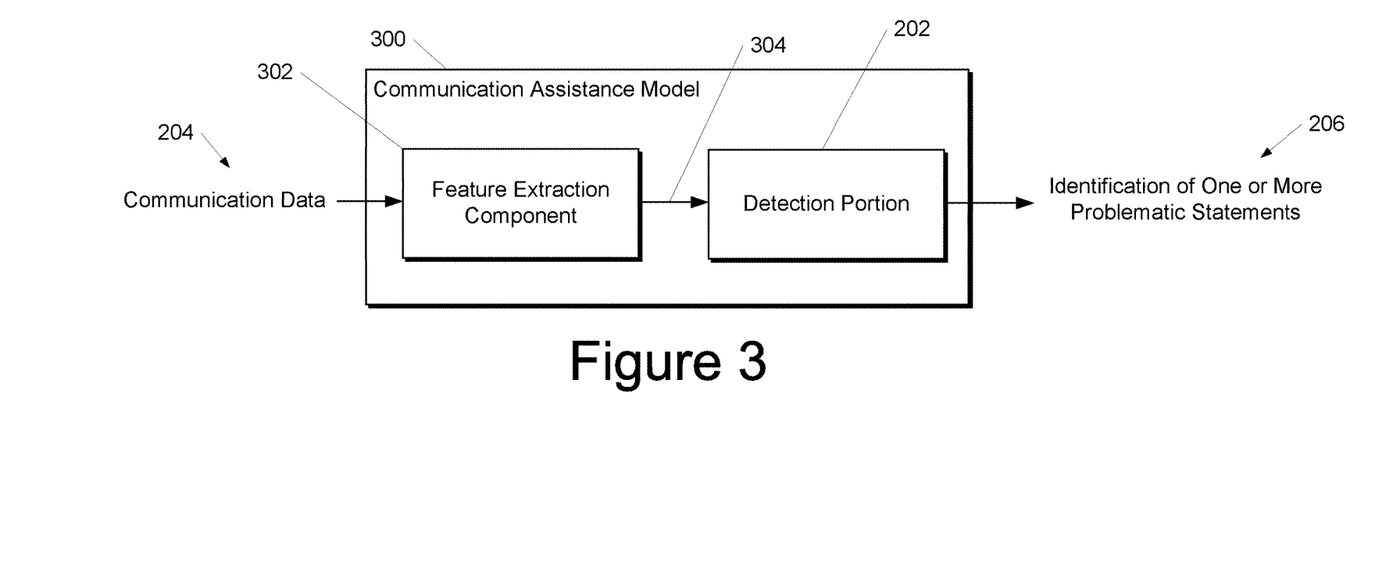
FIG. 3 depicts a block diagram of an example communication assistance model according to example embodiments of the present disclosure.

FIG. 3 depicts a block diagram of an example communication assistance model 300 according to example embodiments of the present disclosure. The communication assistance model 300 is similar to model 200 of FIG. 2 except that model 300 further includes a feature extraction component 302. The feature extraction component 302 extracts one or more features 304 from the set of communication data 204. The extracted features 304 can then be provided to the detection portion 202 (e.g., a neural network or other machine-learned model) for use in detecting any problematic statement(s) included in the communication based at least in part on such features.

Figure 4:
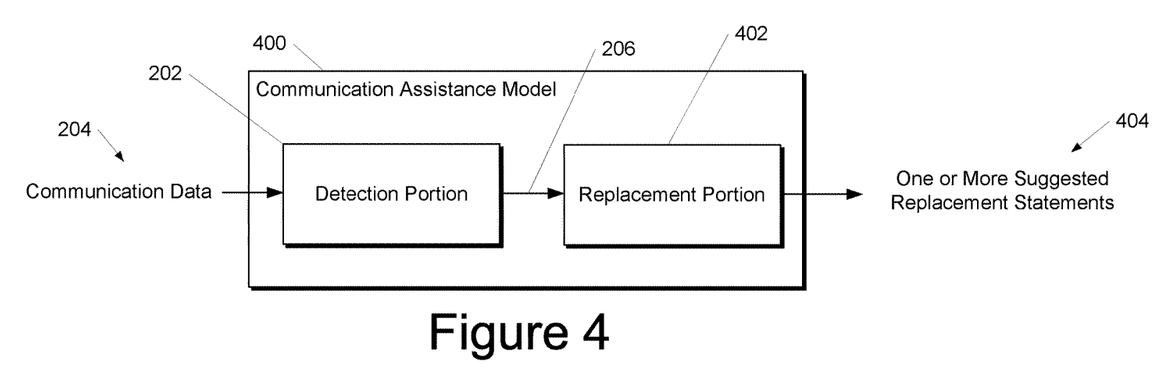
FIG. 4 depicts a block diagram of an example communication assistance model according to example embodiments of the present disclosure.

FIG. 4 depicts a block diagram of an example communication assistance model 400 according to example embodiments of the present disclosure. The communication assistance model 400 is similar to model 200, except that model 400 further includes a replacement portion 402. The replacement portion 402 can provides one or more suggested replacement statements 404 to respectively replace the one or more problematic statements 206.

As examples, the replacement portion 402 of the communication assistance model 400 can include one or more neural networks (e.g., recurrent neural networks such as LSTM recurrent neural networks), phrase-based translators, sequence-to-sequence models, or other machine translators. As another example, the replacement portion 402 of the communication assistance model 400 can include a set of phrases component that substitutes a given problematic phrase with a respective non-problematic phrase associated therewith. The set of corresponding problematic/non-problematic phrases can be learned from data and/or manually created.

Figure 5:
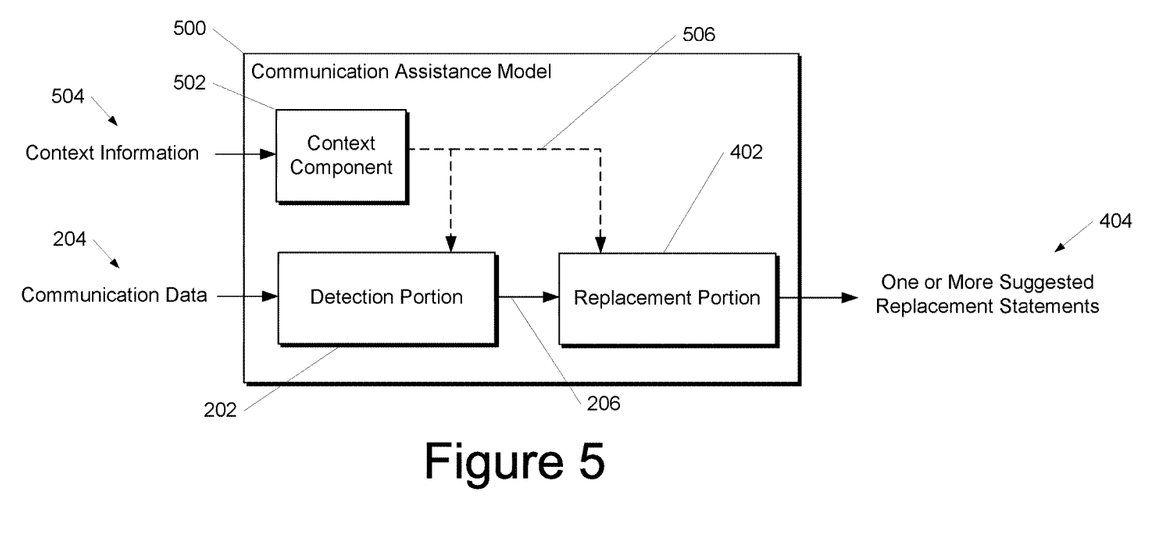
FIG. 5 depicts a block diagram of an example communication assistance model according to example embodiments of the present disclosure.

FIG. 5 depicts a block diagram of an example communication assistance model 500 according to example embodiments of the present disclosure. The communication assistance model 500 is similar to model 400 of FIG. 4 except that model 500 further includes a context component 502.

More particularly, as described above, the threshold for what is considered problematic human communication can be strongly context-dependent. For example, it is common that an individual may use different wording or tones depending upon the recipient of the communication (e.g., compare the appropriate tone of an email containing a PhD application to a professor versus the appropriate tone of an email to a friend of twenty years).

As such, the communication assistance model 500 can include a context component 502 that assists in performing context-specific detection and/or replacement of problematic statements based on context information 504. As examples, the context information 504 can include the identity of the author, the identity of the recipient, a current message thread, previous threads, and/or other information.

As an example, in some implementations, the context component 504 can receive the identity of the author, the identity of the recipient, and/or other contextual information 504 as inputs and, in response, output a context score 506. In some implementations, the context score 506 can describe an expected tone for the communication (e.g., whether the communication is expected to or should be polite, professional, casual, direct, etc.). In other implementations, the context score 506 can include one or more numerical scores that indicate expected values for certain communication characteristics (e.g., tone, language, grammatical precision, etc.).

In some implementations, the context score 506 can be input into the detection portion 202 of the communication assistance model 500 (e.g., an LSTM recurrent neural network) along with the communication data 204. The context score 506 can assist the detection portion 202 of the communication assistance model 500 in determining which, if any, portions of the communication should be identified as problematic.

In addition to or alternatively to use of the context score 506 by the detection portion 202, the replacement portion 402 of the communication assistance model 500 can use the context score 506 to assist in producing suitable suggested replacement statements 404. In particular, an appropriate replacement statement can differ if the communication is directed to a close friend rather than a professional colleague. Therefore, in some implementations, the context score 506 can be input into the replacement portion 402 of the communication assistance model 500 along with the identification 206 of the one or more problematic statements included in the communication. The replacement portion 402 can output the suggested replacement statements 404 respectively for the problematic statements 206 based at least in part on the context score 506.

In some implementations, the context component 502 can include one or more machine-learned models such as, for example, one or more neural networks. As one example, in some implementations, given appropriate user consent, a neural network or other machine-learned model can be trained for each pair of author and recipient. For example, the context component 502 can be trained on one or more previous communications from the author (e.g., to the particular intended recipient), so as to recognize or otherwise learn an expected tone for the author (e.g., as relative to the particular intended recipient). In some implementations, to enhance user privacy, the communications themselves are not stored, but scores descriptive of certain communication characteristics (e.g., tone, language, grammatical precision, etc.) can be determined and stored instead, for use in training a user-specific context component 502. In addition, as described above, in some implementations, users may be provided with an opportunity to adjust settings to control whether and how much (if any) the systems of the present disclosure collect and/or analyze communication data.

In some implementations, rather than a discrete context component 502, the various models of the detection portion 202 and/or replacement portion 402 of the communication assistance model 500 can be trained to have the identity of the sender, the identity of the recipient, and/or other contextual information 504 as explicit input features. For example, one or more models of the replacement portion 402 can be trained from the beginning incorporating sender and recipient as input features, allowing the model to capture particularities during the regular training process.

Example Methods

Figure 6:
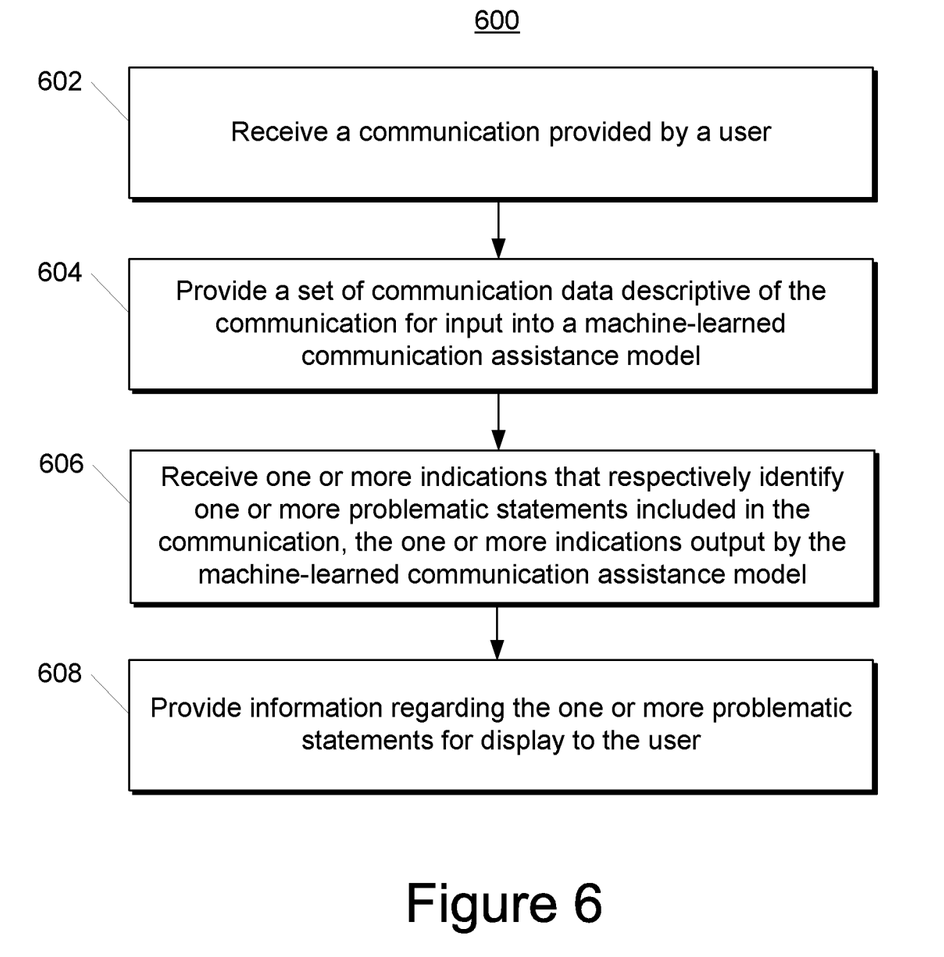
FIG. 6 depicts a flow chart diagram of an example method to perform communication assistance according to example embodiments of the present disclosure.

FIG. 6 depicts a flow chart diagram of an example method to perform communication assistance according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system receives a communication provided by a user. As examples, the communication can be entered into a user computing device via a keyboard or dictated via a microphone.

At 604, the computing system provides a set of communication data descriptive of the communication for input into a machine-learned communication assistance model. For example, a user computing device can input the set of communication data into a local machine-learned communication assistance model. As another alternative example, a user computing device can transmit the set of communication data over a network to a server computing device and the server computing device can input the set of communication data into a machine-learned communication assistance model stored at the server computing device.

In some implementations, providing the set of communication data at 604 includes providing a string of text for input into the machine-learned communication assistance model. In particular, the string of text can be input into the machine-learned communication assistance model according to an order of user entry associated with the string of text (e.g., in the order in which it was received).

At 606, the computing system receives one or more indications that respectively identify one or more problematic statements included in the communication. The one or more indications can have been output by the machine-learned communication assistance model. For example, the user computing device can receive the indications from a local model or from the server over the network.

In some implementations, receiving the indications at 606 can include receiving one or more suggested replacement statements to respectively replace the one or more problematic statements. The one or more suggested replacement statements can have been output by the machine-learned communication assistance model. For example, the user computing device can receive the suggested replacement statements from a local model or from the server over the network.

At 608, the computing system provides information regarding the one or more problematic statements for display to the user. In some implementations, providing the information at 608 regarding the problematic statements can include providing the one or more suggested replacement statements for display to the user.

As one example, a non-intrusive notification (e.g., a pop-up window or icon in a lower screen area) can be provided that simply notifies the user of the existence of the one or more problematic statements. If the user selects or otherwise engages with the notification, additional information (e.g., explicit identification of the problematic statements and/or suggested replacement statements) can be displayed or otherwise provided.

As another example, portions of a communication designated as problematic can be displayed differently from non-problematic portions within the communication composition interface. For example, problematic statements can be highlighted, underlined, or otherwise visually set apart from the non-problematic portions.

As yet another example, the systems and methods of the present disclosure can automatically replace the one or more problematic statements with the one or more suggested replacement statements. After automatic replacement, the inserted replacement statements can be highlighted or otherwise visually set apart and the user can be provided with the option of undoing or otherwise rejecting the automatic replacements (e.g., by right clicking and rejecting the replacement). Thus, the user can be provided with controls that enable the user to always maintain full control of the ultimate content of the communication. Likewise, in some implementations, automatic replacement only occur if explicitly turned on by a user setting.

Furthermore, as described above, in some implementations, the mechanism by which the systems of the present disclosure notify the user of the problematic statement or otherwise intervene can be a function of or otherwise dependent upon confidence score(s) provided by the communication assistance model for the problematic statement (s). Thus, for example, a non-intrusive notification can be provided for a first problematic statement that has a confidence score that is less than a particular threshold value (but greater than a base threshold value), while a second problematic statement that has a confidence score greater than the particular threshold value can be automatically replaced (e.g., with a suggested replacement statement).

As another example, the notification mechanisms can be adjusted based on user-specific feedback. For example, if a user repeatedly ignores or dismisses suggested replacements, the notifications can be reduced or made less intrusive, so that a user who does not value the communication assistance is not continuously pestered. On the other hand, if a user repeatedly accepts suggested replacement statements, the notifications can be increased or made more automatic, so that a user who appreciates and uses the communication assistance is provided with additional assistance.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for communication assistance, the method comprising:
    receiving, by one or more computing devices, a first communication provided by a user;
    providing, by the one or more computing devices, a first set of sequential communication data descriptive of the first communication provided by the user for input into a machine-learned communication assistance model that comprises a detection portion that comprises a first recurrent neural network and a replacement portion that comprises a second recurrent neural network;
    receiving, by the one or more computing devices, one or more indications that respectively identify one or more problematic statements included in the first communication, the one or more indications output by the first recurrent neural network of the detection portion of the machine-learned communication assistance model;
    receiving, by the one or more computing devices, one or more suggested replacement statements to respectively replace the one or more problematic statements, the one or more suggested replacement statements output by the second recurrent neural network of the replacement portion of the machine-learned communication assistance model; and
    providing, by the one or more computing devices, information regarding the one or more problematic statements for display to the user, wherein providing, by the one or more computing devices, the information regarding the one or more problematic statements for display to the user comprises providing, by the one or more computing devices, the one or more suggested replacement statements for display to the user.

2. The computer-implemented method of claim 1, wherein providing, by the one or more computing devices, the first set of sequential communication data for input into the machine-learned communication assistance model comprises providing, by the one or more computing devices, a string of text for input into the machine-learned communication assistance model, the string of text input into the machine-learned communication assistance model according to an order of user entry associated with the string of text.

3. The computer-implemented method of claim 1, wherein receiving, by the one or more computing devices, the one or more indications that respectively identify the one or more problematic statements included in the first communication comprises receiving, by the one or more computing devices, the one or more indications that respectively identify the one or more problematic statements that have an inappropriate tone relative to an intended recipient of the first communication.

4. The computer-implemented method of claim 1, wherein receiving, by the one or more computing devices, the one or more indications that respectively identify the one or more problematic statements included in the first communication comprises receiving, by the one or more computing devices, the one or more indications that respectively identify the one or more problematic statements that respectively include one or more of: offensive language, confidential information, or legally problematic statements.

5. The computer-implemented method of claim 1, further comprising:
    automatically replacing, by the one or more computing devices, the one or more problematic statements in the first communication with the one or more suggested replacement statements.

6. The computer-implemented method of claim 1, wherein providing, by the one or more computing devices, information regarding the one or more problematic statements for display to the user comprises providing, by the one or more computing devices, a notification for display within a user interface, wherein the notification indicates the existence of the one or more problematic statements.

7. A computing system to provide communication assistance, the computing system comprising:
    at least one processor;
    a machine-learned communication assistance model that comprises a detection portion that comprises a first recurrent neural network and a replacement portion that comprises a second recurrent neural network, wherein the first recurrent neural network is trained to receive a first set of sequential communication data descriptive of a first communication provided by a user and, in response to receipt of the first set of sequential communication data, detect one or more problematic statements included in the first communication, and wherein the second recurrent neural network is configured to generate one or more suggested replacement statements to respectively replace the one or more problematic statements; and
    at least one tangible, non-transitory computer-readable medium that stores instructions that, when executed by the at least one processor, cause the at least one processor to:
        obtain the first set of sequential communication data descriptive of the first communication provided by the user;
        input the first set of sequential communication data into the communication assistance model; and receive, as an output of the communication assistance model, one or more indications that respectively identify the one or more problematic statements included in the first communication and the one or more suggested replacement statements to respectively replace the one or more problematic statements.

8. The computing system of claim 7, wherein the one or more problematic statements include one or more of: an inappropriate tone, offensive language, confidential information, or legally problematic statements.

9. The computing system of claim 7, wherein one or both of the first recurrent neural network and the second recurrent neural comprises a long short-term memory recurrent neural network.

10. The computing system of claim 7, wherein:
the communication assistance model comprises a feature extraction component;
the instructions that cause the at least one processor to input the first set of sequential communication data into the communication assistance model cause the at least one processor to input the first set of sequential communication data into the feature extraction component;
the feature extraction component extracts one or more features of the first communication; and
the communication assistance model outputs the one or more indications based at least in part on the one or more features extracted by the feature extraction component.

11. The computing system of claim 7, wherein the communication assistance model outputs, for each of the one or more problematic statements, at least one confidence score for at least one of a plurality of categories of problematic statements.

12. The computing system of claim 11, wherein execution of the instructions further causes the computing system to select one of a plurality of different interventions based at least in part on the at least one confidence score, wherein each of the plurality of different interventions alerts the user to the existence of the one or more problematic statements, and wherein the plurality of different interventions have different amounts of intrusiveness.

13. The computing system of claim 7, wherein:
the communication assistance model comprises a context component;
execution of the instructions further causes the at least one processor to input information about the user and an intended recipient of the first communication into the context component;
in response to receipt of the information about the user and the intended recipient of the first communication, the context component outputs a context categorization that describes an appropriate tone for the first communication;
the first recurrent neural network outputs the one or more indications based at least in part on the context categorization output by the context component.

14. The computing system of claim 7, wherein the second recurrent neural network comprises a machine-learned sequence-to-sequence machine-translation model that translates the one or more problematic statements to the one or more suggested replacement statements.

15. A user computing device, the user computing device comprising:
at least one processor; and
at least one non-transitory computer-readable medium that stores instructions that, when executed by the at least one processor, cause the user computing device to:
receive a first communication provided by a user;
provide a first set of communication data descriptive of the first communication provided by the user for input into a machine-learned communication assistance model that comprises a detection portion that comprises a first recurrent neural network and a replacement portion that comprises a second recurrent neural network;
receive one or more indications that respectively identify one or more problematic statements included in the first communication, the one or more indications output by the first recurrent neural network of the detection portion of the machine-learned communication assistance model;
receive one or more suggested replacement statements to respectively replace the one or more problematic statements, the one or more suggested replacement statements output by the second recurrent neural network of the replacement portion of the machine-learned communication assistance model; and
display a notification that indicates the existence of the one or more problematic statements, wherein the notification provides the one or more suggested replacement statements to the user.

16. The user computing device of claim 15, wherein the at least one non-transitory computer-readable medium of the user computing device stores the machine-learned communication assistance model.

* * * * *